United States Patent
Bertola et al.

(10) Patent No.: US 12,460,676 B2
(45) Date of Patent: Nov. 4, 2025

(54) ROLLER BEARING HAVING RADIALLY INNER RACEWAYS WITH AN OPTIMIZED PROFILE AND ASSOCIATED RADIALLY OUTER RING OF A BEARING

(71) Applicant: AKTIEBOLAGET SKF, Götenborg (SE)

(72) Inventors: Maurizio Bertola, Piscina (IT); Pruthviraj Mandya Shekar, Mandya (IN); Carmelo Gulli, Turin (IT)

(73) Assignee: Aktiebolaget SKF, Götenborg (SE)

( * ) Notice: Subject to any disclaimer, the term of this patent is extended or adjusted under 35 U.S.C. 154(b) by 192 days.

(21) Appl. No.: 18/238,717

(22) Filed: Aug. 28, 2023

(65) Prior Publication Data

US 2024/0077113 A1 Mar. 7, 2024

(30) Foreign Application Priority Data

Sep. 2, 2022 (IT) .......................... 102022000018012

(51) Int. Cl.
*F16C 33/58* (2006.01)
*F16C 19/18* (2006.01)

(52) U.S. Cl.
CPC .......... *F16C 33/583* (2013.01); *F16C 19/184* (2013.01); *F16C 19/186* (2013.01); *F16C 2326/02* (2013.01)

(58) Field of Classification Search
CPC .... F16C 19/186; F16C 33/583; F16C 33/585; F16C 2240/70; F16C 2326/02; F16C 19/184; B60B 27/0005
See application file for complete search history.

(56) References Cited

U.S. PATENT DOCUMENTS 5,051,004 A * 9/1991 Takeuchi .............. F16C 33/585
384/512
5,501,530 A * 3/1996 Nagai ................. B60B 27/0005
384/516

(Continued)

FOREIGN PATENT DOCUMENTS

JP H0830497 3/1996
JP 2013053707 3/2013

OTHER PUBLICATIONS

International Search Report for corresponding Italy Patent Application No. 102022000018012 dated Mar. 10, 2023.

*Primary Examiner* — Alan B Waits
(74) *Attorney, Agent, or Firm* — J-TEK LAW PLLC; Scott T. Wakeman; Mark A. Ussai

(57) ABSTRACT

A rolling bearing includes an outer ring, an inner ring, and a plurality of rolling bodies between the rings. The outer ring includes a first and a second annular raceway, both formed on an inner lateral surface of the outer ring, and an axial shoulder extending in a radially inward direction and formed between the two raceways. The axial shoulder includes a first curvilinear portion formed by a first arc of a first circle with a first radius of curvature and a geometric center projected in a radially inward direction, and a second curvilinear portion formed by a second arc of a second circle comprising a second radius of curvature and a geometric center projected in a radially outward direction. The two curvilinear portions are flush connected to one another by an inflection point, the inflection point representing a tangent point of the first and second circles.

12 Claims, 4 Drawing Sheets

(56) References Cited

U.S. PATENT DOCUMENTS

| | | | |
|---|---|---|---|
| 8,840,313 B2* | 9/2014 | Komori | F16C 33/585 |
| | | | 384/513 |
| 9,200,669 B2* | 12/2015 | Torii | F16C 33/7876 |
| 9,759,254 B2* | 9/2017 | Komori | F16C 19/08 |

* cited by examiner

ROLLER BEARING HAVING RADIALLY INNER RACEWAYS WITH AN OPTIMIZED PROFILE AND ASSOCIATED RADIALLY OUTER RING OF A BEARING

CROSS-REFERENCE TO RELATED APPLICATIONS

This application is based on and claims priority to Italian Patent Application No. 102022000018012 filed on Sep. 2, 2022, under 35 U.S.C. § 119, the disclosure of which is incorporated by reference herein.

FIELD

The present disclosure relates to rolling bearings for hub bearing units.

SUMMARY

In some embodiments, a rolling bearing may include a radially outer ring that may include a first annular raceway and a second annular raceway, both formed on a radially inner lateral surface of the outer ring. The outer ring may include an axial shoulder extending in a radially inward direction and may be formed between the first and second annular raceways. The axial shoulder may include a first curvilinear stretch formed by a first arc of a first circle with a first radius of curvature and a first geometric center projected in a radially inward direction toward the inner ring, and a second curvilinear stretch including a second arc of a second circle with a second radius of curvature and a second geometric center projected in a radially outward direction away from the inner ring. In some embodiments, the first and second curvilinear portions are flush connected to one another by a first inflection point, the first inflection point representing a tangent point of the first circle and the second circle. The rolling bearing may further include a radially inner ring and a first row and a second row of a plurality of rolling bodies interposed between the inner ring and the outer ring.

In some embodiments, the first radius of curvature is smaller than the second radius of curvature.

In some embodiments, the second radius of curvature may include approximately three times the first radius of curvature, and the second radius of curvature is equal to a sum of an axial length of the first curvilinear stretch and an axial length of the second curvilinear stretch.

In some embodiments, the inner ring of the rolling bearing may include a first axial end, a second axial end axially opposite the first axial end, and a first flange adjacent to the first axial end and formed integrally with the inner ring. The first flange may include a flat face on an axially outer side thereof.

In some embodiments, the first and second row of rolling bodies may each include a primitive diameter.

In some embodiments, a distance measured from an axially outer surface of the second axial end to the flat face of the first flange may be less than 2.5 times a sum of a distance between the primitive diameters of the first and second rows of rolling bodies, a radius of a rolling body in the first row of rolling bodies, and a radius of a rolling body in the second row of rolling bodies.

In some embodiments, the radius of the rolling body in the first row and the radius of the rolling body in the second row may be unequal.

In some embodiments, the radial shoulder of the outer ring may further include a first terminal portion adjacent to the first annular raceway and a second terminal portion adjacent to the second annular raceway and on an opposite axial side of the axial shoulder than the first terminal portion. The first curvilinear stretch may extend from a first demarcation point at the first terminal portion to the first inflection point, and the second curvilinear stretch may extend from the first inflection point to a second demarcation point of the second terminal portion. In some embodiments, the first demarcation point may be tangent to an arc of a circle having a radius equal to half the diameter of the first row of rolling bodies.

In some embodiments, a diameter of the first terminal portion may be larger than a diameter of the second terminal portion.

In some embodiments, the first terminal portion and the second terminal portion may be configured as tool unloading portions to allow mechanical machining of the first annular raceway and the second annular raceway, respectively.

In some embodiments, the first terminal portion may include a third arc of a third circle with a geometric center projected in the axially outward direction, and the first terminal portion may connect flush with the first curvilinear stretch at a second inflection point, the second inflection point representing a tangent point of the first circle and the third circle.

In some embodiments, the second curvilinear stretch may further include a first straight section and a third curvilinear stretch connecting the first straight section and the second terminal portion. The third curvilinear stretch may be defined by a fourth arc of a fourth circle with a geometric center projected in the axially outward direction.

BRIEF DESCRIPTION OF THE DRAWINGS

Further features and advantages of the present disclosure will become clear from the following description of an exemplary embodiment thereof, provided with reference to the attached figures, in which.

DETAILED DESCRIPTION

Figure 1:
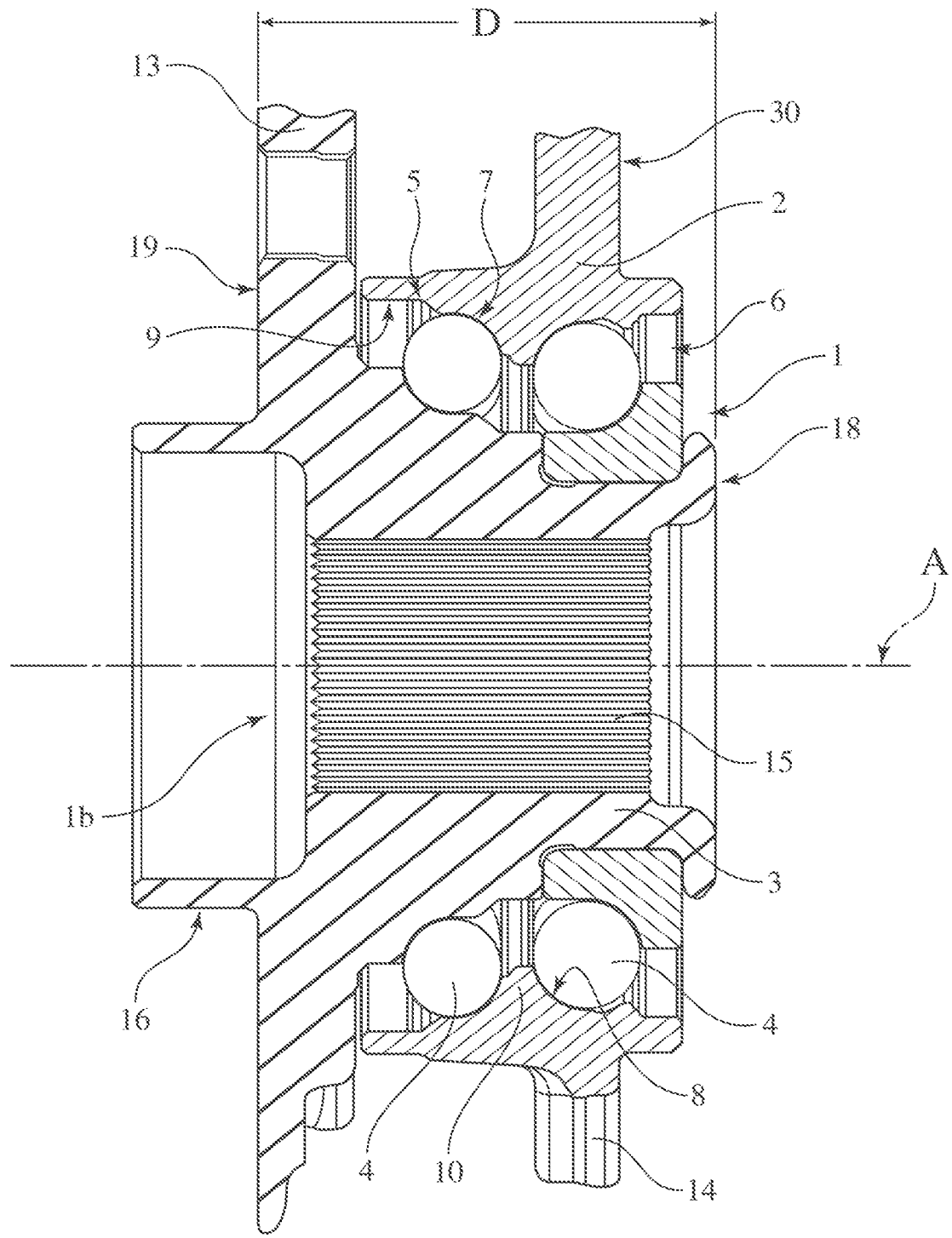
FIG. 1 shows a radial cross section in longitudinal view of a hub bearing unit including a rolling bearing according to exemplary embodiments of the disclosure.
Figure 2:
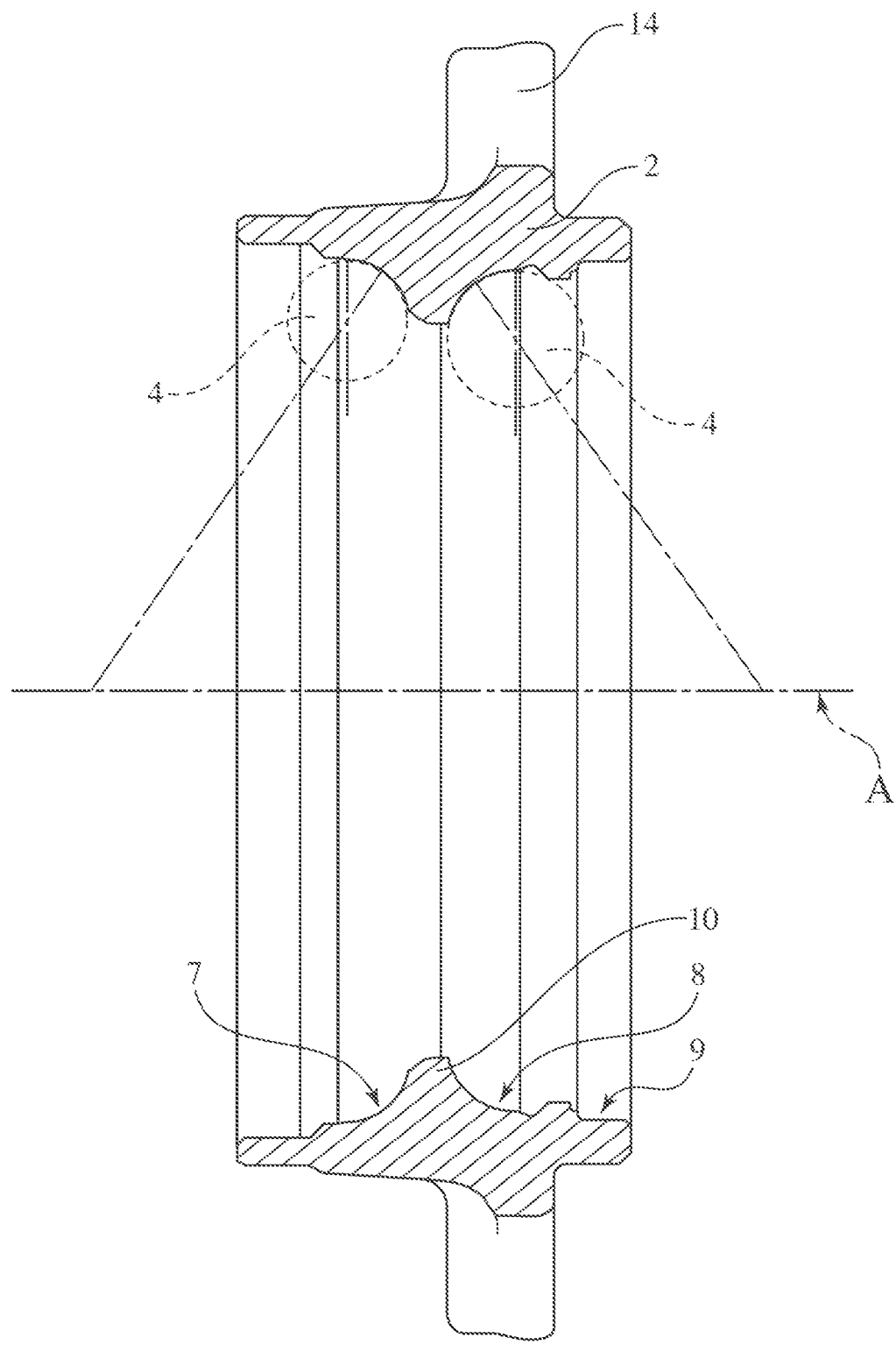
FIG. 2 shows a radial cross section of an outer ring of the rolling bearing of FIG. 1 according to exemplary embodiments of the disclosure.

In rolling bearings, rings of a rolling bearing may be subjected to extreme mechanical stresses. In particular, rolling bearings used in hub bearing units of a vehicle may be subjected to stresses at a point of connection between a flange of an outer ring of the rolling bearing and a suspension upright of the hub bearing unit.

A radially inner ring of the rolling bearing often includes a flange integral therewith and formed on a side of the rolling bearing opposite the flange of the outer ring for attachment to a vehicle wheel. In some cases, this flange of the inner ring may be referred to as a spindle of the hub bearing unit when formed thereon.

In this type of rolling bearing, it is increasingly important to reduce an axial distance between the two flanges so as to reduce the overall size of the hub bearing unit. However, this means a reduction in the spacing present between two annular raceways formed on the radially inner lateral surface of the outer ring for the rolling bodies of the rolling bearing or of the hub bearing unit in which the rolling bearing is integrated.

The raceways are often quenched, generally by induction heating, to ensure a hardness profile sufficient to withstand stresses exchanged with the rolling bodies. A problem arises when quenching the raceways because it is not desirable to quench the inner surface of the outer ring that separates the two raceways. When this portion of the inner surface of the outer ring, sometimes constituting an axial shoulder of the outer ring, is quenched, the resilience of the outer ring is reduced, resulting in an undesirable embrittlement of the outer ring that leads to cracks and micro-cracks.

To avoid this drawback, known solutions require this section of the outer ring between the raceways to be sufficiently large enough, generally larger than 5 mm, to ensure that only the two raceways are subject to quenching. However, this produces a hub bearing unit with axial dimensions that are too large, even when the rolling bearing of the hub bearing unit is an asymmetric rolling bearing.

Therefore, an aim of the present disclosure is to provide a rolling bearing that overcomes the aforementioned disadvantages of know rolling bearings and which has compact axial dimensions, but without risk of through-quenching during heat treatment for hardening raceways of the rolling bearing.

In doing do, the present disclosure also aims to provide an outer ring of a rolling bearing that is reliable and easy to machine and is not affected by through-quenching.

As illustrated in FIGS. 1 through 4, a hub bearing unit 1b may include a rolling bearing 1 integrated therein. In some embodiments, rolling bearing 1 may constitute hub bearing unit 1b. In some embodiments, hub bearing unit 1b may be for a vehicle. In some embodiments, hub bearing unit 1b may be a compact, asymmetrical rolling bearing, which may be referred to as a "third-generation" rolling bearing. In other embodiments, hub bearing unit 1b may be a first-generation rolling bearing or a second-generation rolling bearing without departing from the scope of this disclosure.

In some embodiments, rolling bearing 1 may include a radially outer ring 2, a radially inner ring 3 that may be coaxial with and housed at least partially within radially outer ring 2, and a plurality of rolling bodies 4 interposed between inner ring 3 and outer ring 2 enabling relative rotational motion of inner ring 3 and outer ring 2 with low friction.

In some embodiments, rolling bodies 4 may form a first row of rolling bodies 5 and a second row of rolling bodies 6. In some embodiments, rolling bodies 4 may be balls, needle rollers, or other known rolling bodies.

In some embodiments, rolling bodies 4 of first row 5 may engage with a first annular raceway 7, and rolling bodies 4 of second row 6 may engage with a second annular raceway 8. In some embodiments, first and second annular raceways 7 and 8 may be formed on a radially inner later surface 9 of outer ring 2.

In some embodiments, outer ring 2, inner ring 3, raceways 7 and 8, and rows of rolling bodies 5 and 6 each may have an axis of symmetry coinciding with an axis of symmetry A of hub bearing unit 1b.

In some embodiments, annular raceways 7 and 8 may be arranged side by side and adjacent to each other, which may be referred to as an "in tandem" arrangement. In some embodiments, annular raceways 7 and 8 may be separated from each other by an annular axial shoulder 10 that may extend as a protrusion in a radially inward direction from radially inner annular surface 9. In some embodiments, annular axial shoulder 10 may be referred to as a "tooth."

In some embodiments, axial shoulder 10 may be configured to withstand, during use, an axial thrust of rolling bodies 4. In some embodiments, rolling bearing 1 may be referred to as a "hybrid" rolling bearing capable of withstanding both radial and axial loads.

To this end, axial shoulder 10 may be bounded on opposite axial sides by a first portion 11 and by a second portion 12. In some embodiments, first portion 11 may be adjacent to first annular raceway 7 and second portion 12 may be adjacent to second annular raceway 8 (see, e.g., FIG. 3).

It will be appreciated by persons of ordinary skill in the art that this description of axial shoulder 10 also applies to mirror image embodiments in which inner ring 3 has an axial shoulder defined in the same way as axial shoulder 10 of outer ring 2.

In some embodiments, radially inner ring 3 may be provided integral in one piece with a first flange 13 that may receive, during use, a vehicle wheel (known and not illustrated to simplify the figures) and radially outer ring 2 may be provided with a second flange 14 that may connect rolling bearing 1 with a vehicle suspension upright (known and not shown to simplify the figures). In some embodiments, first flange 13 and second flange 14 may be formed integrally as one piece with inner ring 3 and outer ring 2, respectively.

In embodiments in which rolling bearing 1 is a "second-generation" bearing, inner ring 3 and outer ring 2 may be provided with first flange 13 and second flange 14. In embodiments in which rolling bearing 1 is a "first-generation" bearing, inner ring 3 and outer ring 2 may have no attachment flanges. In such embodiments, both rings 2 and 3 may be coupled to a wheel hub and/or a spindle.

In some embodiments, radially inner ring 3 of rolling bearing 1 may include a grooved coupling 15. In some embodiments, grooved coupling 15 may constitute a torque transmission means.

In some embodiments, radially inner ring 3 may be axially bounded between a first end 16 and a second end 18. In some embodiments, first flange 13 may be provided at first end 16 of radially inner ring 3. In some embodiments, first flange 13 may be provided with a flat face 19 on an outer axial side of first flange 13 and facing axially opposite second flange 14 of outer ring 2. In some embodiments, flat face 19 may be an axial distance D from an outer axial face of second end 18.

In some embodiments, to optimize an overall axial size of the rolling bearing 1, first and the second rows of rolling bodies 5 and 6 may be arranged axially between flat face 19 of first flange 13 and a second flat face 30 of second flange 14, facing the first end 16 and the second end 18, respectively, of the radially inner ring 3.

Figure 3:
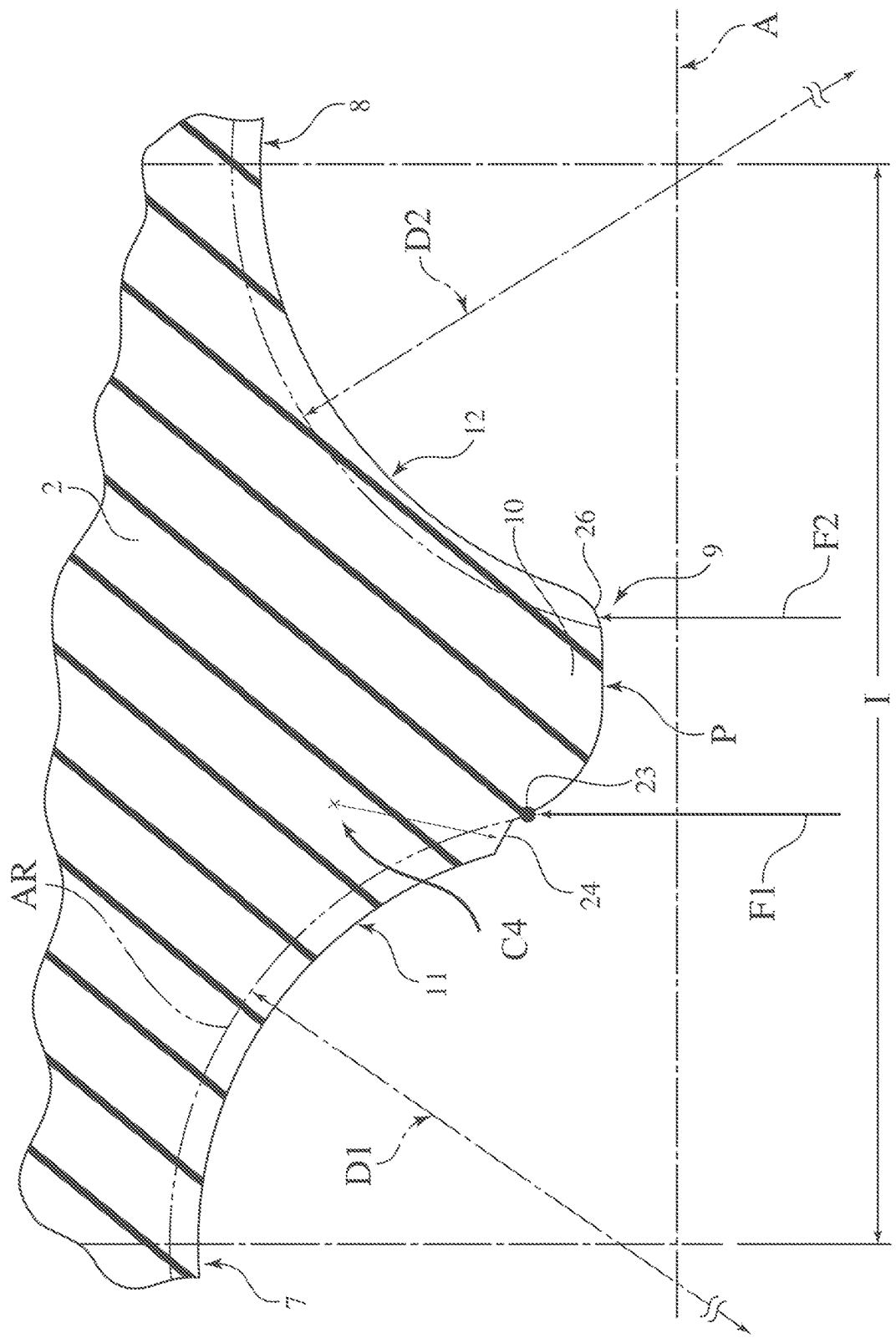
FIG. 3 shows an enlarged view of a radially inner lateral surface of the outer ring of FIG. 2 according to exemplary embodiments of the disclosure.
Figure 4:
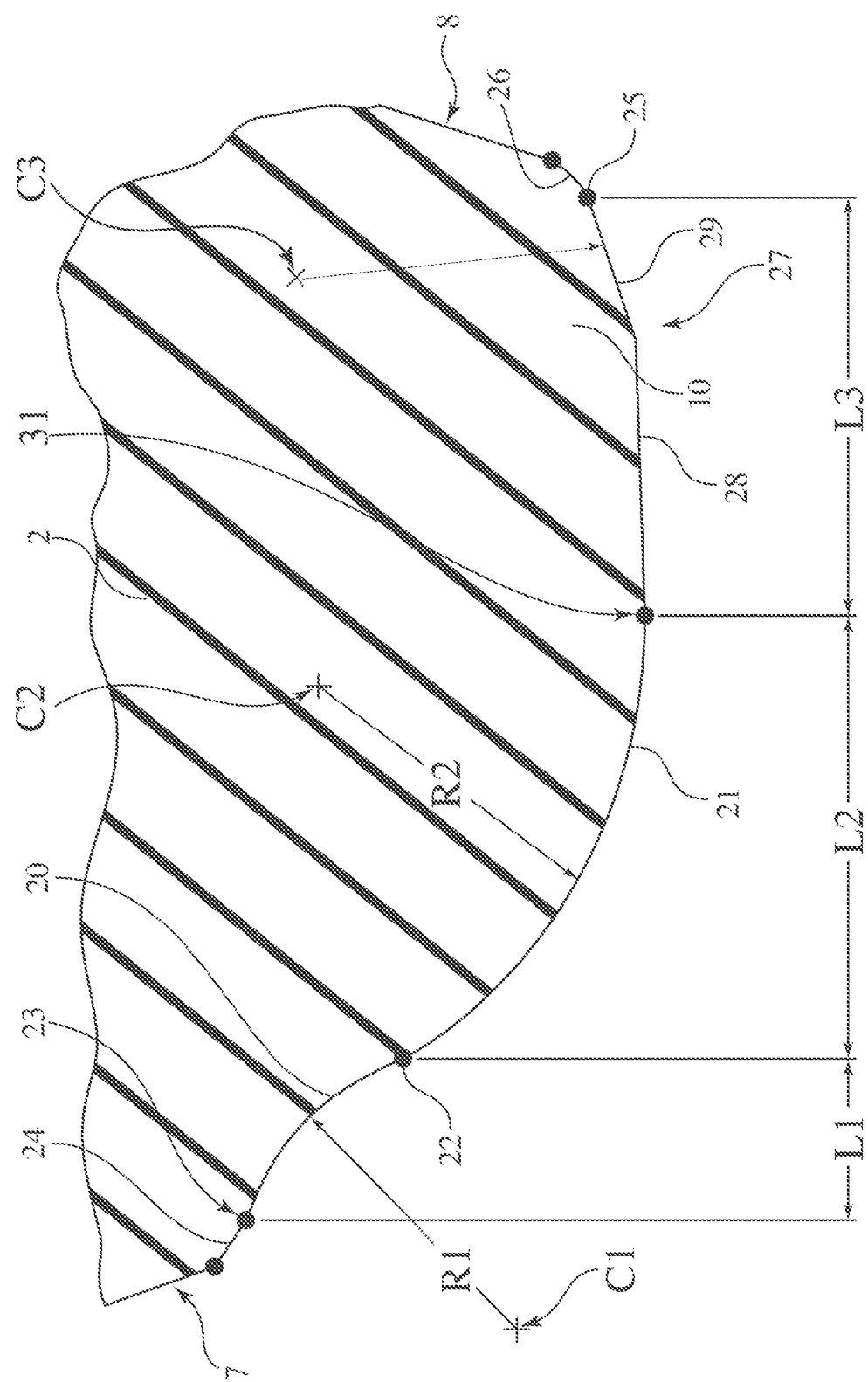
FIG. 4 shows an enlarged view of an axial shoulder of the radially inner lateral surface of the outer ring of FIG. 2.

As described herein, a "compact asymmetrical rolling bearing" refers to a rolling bearing (e.g., rolling bearing 1) in which flat face 19 of first flange 13 may be arranged at an axial distance from second end 18 of inner ring 3 that is less than 2.5 times a spacing I (see, e.g., FIG. 3). In some embodiments, spacing I may be defined as a distance between primitive diameters D1 and D2 of first row of rolling bodies 5 and second row of rolling bodies 6, respectively, plus a radius of a rolling body 4 in first row 5 and a radius of a rolling body 4 in second row 6. In some embodiments, a radius of each rolling body 4 in first row 5 may be different than a radius of each rolling body 4 in second row 6.

In some embodiments, particularly in embodiments in which rolling bearing 1 is asymmetrical, annular raceway 7 may have a diameter measured at an axially inner end F1 of annular raceway 7 (see, e.g., FIG. 3) greater than a corresponding diameter of second annular raceway 8 measured at an axially inner end F2 of second annular raceway 8.

In some embodiments, axial shoulder 10 has a pre-defined longitudinal radial profile P that may be arranged axially between first portion 11 and second portions 12 (see, e.g., FIG. 3) of first and second raceways 7 and 8, respectively. As illustrated in detail in FIG. 4, axial shoulder 10 at profile P may include a first curvilinear stretch 20 formed by an arc of a circle having a first pre-defined radius of curvature R1 and a geometric center C1 projected in a radially inward direction, and therefore arranged toward axis of symmetry A. Axial shoulder 10 at profile P may further include a second curvilinear stretch 21 formed by an arc of a circle having a second pre-defined radius of curvature R2 and a geometric center C2 projected in a radially outward direction and, therefore, arranged away from axis of symmetry A.

In some embodiments, first and second curvilinear stretches 20 and 21 may be immediately adjacent to each other and may be flush connected (i.e., without any geometric discontinuities of up to a second kind) by a first inflection point 22 arranged between first and second curvilinear stretches 20 and 21. In some embodiments, first inflection point 22 is a tangent point of the circle forming first curvilinear stretch 20 and the circle forming second curvilinear stretch 21.

In some embodiments, first radius of curvature R1 may be smaller than second radius of curvature R2. In further embodiments, second radius of curvature R2 may be approximately 3 times greater than first radius of curvature R1.

In some embodiments, first curvilinear stretch 20 may extend from a first demarcation point 23 of a first terminal portion 24 of first portion 11 of first annular raceway 7 to first inflection point 22, and second curvilinear stretch 21 may extend from first inflection point 22 to a second demarcation point 25.

Furthermore, in some embodiments, second radius of curvature R2 may be approximately equal to a sum of an axial length L1 of first curvilinear stretch 20 and an axial length L2 of second curvilinear stretch 21. This relationship between radii R1 and R2 and axial lengths L1 and L2 of stretches 20 and 21 ensured that radii R1 and R2 are not too small, so as not to concentrate too much mechanical stress during use on stretches 20 and 21, improving the durability of outer ring 2 and extending the working life of bearing unit 1.

In some embodiments, axial shoulder 10 may further include a second terminal portion 26 of second portion 12 of second annular raceway 8. In some embodiments, second curvilinear portion 21 may include a third stretch 27 extending from a third demarcation point 31 to second demarcation point 25 of terminal portion 26.

In some embodiments, third stretch 27 may further include a straight stretch 28 immediately adjacent to second curvilinear stretch 21 and a fourth stretch 29 having a geometric center of curvature C3 projected in a radially outward direction and therefore arranged away from inner ring 3 and axis of symmetry A. In some embodiments, third stretch 27 may have an axial length L3 measured from third demarcation point 31 and second demarcation point 25.

In some embodiments, first demarcation point 23 may be tangent to an arc of a circle AR (see, e.g., FIG. 3) having a radius equal to half primitive diameter D1 of first row of rolling bodies 5.

Defining stretches 20 and 21 with tangential radii maximizes the amount of material of axial shoulder 10 of outer ring 2 that resides between first annular raceway 7 and second annular raceway 8, and thus maximizes an axial thickness of axial shoulder 10. In this way, an axial thickness of axial shoulder 10. At the same time, the radial profile P of axial shoulder 10, by virtue of stretches 20 and 21 with tangential radii, allows for profile P to me produced by turning, thereby simplifying the mechanical machining of the outer ring 2. Furthermore, the particular configuration of first and second curvilinear stretches 20 and 21 and inflection point 22 permit localized quenching, for example, by induction heating, of first and second annular raceways 7 and 8 without a quenching profile crossing axial shoulder 10, also known as through-quenching. In some embodiments, this through-quenching can be prevented in embodiments where an axial distance between first portion 11 of first annular raceway 7 and second portion 12 of second annular raceway 8 is 5 mm or less.

In some embodiments, a diameter of terminal portion 24 of first portion 11 of first raceway 7 may be larger than a diameter of terminal portion 26 of the second portion 12 of the second raceway 8 for example proportionately to the diameters measured at F1 and F2 shown in FIG. 3.

In some embodiments, terminal portions 24 and 26 may be formed as tool unloading portions to allow simple mechanical machining of annular raceways 7 and 8, respectively.

In some embodiments, terminal portion 24 may have an arc-shaped radial profile formed by a circle with a geometric center of curvature C4 projected in a radially outward direction and therefore opposite axis of symmetry A.

In some embodiments, terminal portion 24 may connect flush with first curvilinear stretch 20 by a second inflection point that coincides with demarcation point 23 of terminal portion 24. In some embodiments, this inflection points represents a tangent point between the circle forming the arc that is terminal portion 24 and the circle forming the arc that is first curvilinear stretch 20.

All the aims of the disclosure are therefore achieved.

We claim:

1. A rolling bearing, comprising:
   a radially outer ring comprising:
   a first annular raceway and a second annular raceway, the first and second annular raceways being formed on a radially inner lateral surface of the outer ring; and
   an axial shoulder extending in a radially inward direction and formed between the first and second annular raceways, the axial shoulder comprising:
   a first curvilinear stretch formed by a first arc of a first circle comprising a first radius of curvature and a first geometric center projected in a radially inward direction toward the inner ring;
   a second curvilinear stretch including a second arc of a second circle comprising a second radius of curvature and a second geometric center projected in a radially outward direction away from the inner ring,
   wherein the first and second curvilinear stretches are flush connected to one another by a first inflection point, the first inflection point representing a tangent point of the first circle and the second circle;

a radially inner ring; and a first row and
a second row of a plurality of rolling bodies interposed between the inner ring and the outer ring.

2. The rolling bearing of claim 1, wherein the first radius of curvature is smaller than the second radius of curvature.

3. The rolling bearing of claim 2, wherein,
the second radius of curvature is three times the first radius of curvature, and
the second radius of curvature is equal to a sum of an axial length of the first curvilinear stretch and an axial length of the second curvilinear stretch.

4. The rolling bearing of claim 1, wherein,
the inner ring further comprises:
a first axial end;
a second axial end axially opposite the first axial end; and
a first flange adjacent to the first axial end, the first flange formed integrally with the inner ring, and the first flange comprising a flat face on an axially outer side of the first flange,
the first and second row of rolling bodies each comprises a diameter, and
a distance measured from an axially outer surface of the second axial end to the flat face of the first flange comprises less than 2.5 times a sum of a distance between the diameters of the first and second rows of rolling bodies, a radius of a rolling body in the first row of rolling bodies, and a radius of a rolling body in the second row of rolling bodies.

5. The rolling bearing of claim 4, wherein the radius of the rolling body in the first row and the radius of the rolling body in the second row are not equal.

6. The rolling bearing of claim 4, wherein the radial shoulder of the outer ring further comprises:
a first terminal portion adjacent to the first annular raceway, wherein the first curvilinear stretch extends from a first demarcation point at the first terminal portion to the first inflection point; and
a second terminal portion adjacent to the second annular raceway and on an opposite axial side of the axial shoulder than the first terminal portion,
wherein the second curvilinear stretch extends from the first inflection point to a second demarcation point of the second terminal portion, and
the first demarcation point is tangent to an arc of a circle comprising a radius equal to half the diameter of the first row of rolling bodies.

7. The rolling bearing of claim 6, wherein a diameter of the first terminal portion is larger than a diameter of the second terminal portion.

8. The rolling bearing of claim 6, wherein,
the first terminal portion comprises a third arc of a third circle with a geometric center projected in the axially outward direction, and
the first terminal portion connects flush with the first curvilinear stretch at a second inflection point, the second inflection point representing a tangent point of the first circle and the third circle.

9. The rolling bearing of claim 6, wherein the second curvilinear stretch further comprises:
a first straight section; and
a third curvilinear stretch connecting the first straight section and the second terminal portion,
wherein the third curvilinear stretch comprises a fourth arc of a fourth circle with a geometric center projected in the axially outward direction.

10. A radially outer ring for a rolling bearing, comprising:
a first annular raceway formed on a radially inner lateral surface of the radially outer ring;
a second annular raceway formed on the radially inner lateral surface of the radially outer ring adjacent to the first annular raceway;
an axial shoulder extending in a radially inward direction and formed between the first and second annular raceways, the axial shoulder comprising:
a first curvilinear stretch formed by a first arc of a first circle comprising a first radius of curvature and a first geometric center projected in a radially inward direction;
a second curvilinear stretch including a second arc of a second circle comprising a second radius of curvature and a second geometric center projected in a radially outward direction, wherein the first and second curvilinear stretches are flush connected to one another by a first inflection point, the first inflection point representing a tangent point of the first circle and the second circle;
a first terminal portion adjacent to the first annular raceway, wherein the first curvilinear stretch extends from a first demarcation point of the first terminal portion to the first inflection point;
a second terminal portion adjacent to the second annular raceway and on an opposite axial side of the axial shoulder than the first terminal portion, wherein the second curvilinear stretch extends from the first inflection point to a second demarcation point of the second terminal portion,
wherein the first terminal portion and the second terminal portion are separated by an axial distance of 5 mm or less, and
the second radius of curvature is three times greater than the first radius of curvature, and the second radius of curvature is equal to a sum of an axial length of the first curvilinear portion and an axial length of the second curvilinear portion.

11. The outer ring of claim 10, wherein,
the first terminal portion comprises a third arc of a third circle with a geometric center projected in the axially outward direction, and
the first terminal portion connects flush with the first curvilinear stretch at a second inflection point, the second inflection point representing a tangent point of the first circle and the third circle.

12. The rolling bearing of claim 10, wherein the second curvilinear stretch further comprises:
a first straight section; and
a third curvilinear stretch connecting the first straight section and the second terminal portion,
wherein the third curvilinear stretch comprises a fourth arc of a fourth circle with a geometric center projected in the axially outward direction.

* * * * *